(12) United States Patent
Ouchi et al.

(10) Patent No.: US 10,983,328 B2
(45) Date of Patent: *Apr. 20, 2021

(54) STRUCTURED ILLUMINATION MICROSCOPE APPARATUS AND AN IMAGE FORMING APPARATUS

(71) Applicants: NIKON CORPORATION, Tokyo (JP); THE REGENTS OF THE UNIVERSITY OF CALIFORNIA, San Francisco, CA (US)

(72) Inventors: Yumiko Ouchi, Yokohama (JP); Hisao Osawa, Kashiwa (JP); Mats G. L. Gustafsson, Sterling, VA (US); David A. Agard, Burlingame, CA (US)

(73) Assignees: NIKON CORPORATION, Tokyo (JP); THE REGENTS OF THE UNIVERSITY OF CALIFORNIA, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/674,631

(22) Filed: Nov. 5, 2019

(65) Prior Publication Data
US 2020/0064617 A1 Feb. 27, 2020

Related U.S. Application Data

(63) Continuation of application No. 14/834,755, filed on Aug. 25, 2015, now Pat. No. 10,502,945, which is a
(Continued)

(51) Int. Cl.
*G02B 21/00* (2006.01)
*H04N 7/00* (2011.01)
(Continued)

(52) U.S. Cl.
CPC ......... *G02B 21/367* (2013.01); *G02B 5/3083* (2013.01); *G02B 21/0032* (2013.01);
(Continued)

(58) Field of Classification Search
CPC .. G02B 5/3083; G02B 21/0032; G02B 21/06; G02B 21/367; G02B 27/1066;
(Continued)

(56) References Cited

U.S. PATENT DOCUMENTS 5,070,250 A 12/1991 Komatsu et al.
5,136,666 A * 8/1992 Anderson ............... G02B 6/24
359/3
(Continued)

FOREIGN PATENT DOCUMENTS

DE 10 2007 047 466 A1 4/2009
DE 10 2007 047 468 A1 4/2009
(Continued)

OTHER PUBLICATIONS

"Quarter Wave Retarders _ Retardation Film _ Wave Plates". American Polarizers, Inc. Apr. 5, 2009. http://web.archive.org/web/20090405202901 /http://www.apioptics.com/quarter-wave-retarders.html.
(Continued)

*Primary Examiner* — Zhihan Zhou
(74) *Attorney, Agent, or Firm* — Oliff PLC

(57) ABSTRACT

Polarized light which is emitted from an optical fiber becomes circular polarized light by passing through a first quarter wave plate. The circular polarized light which has entered a second quarter wave plate is converted into nearly linear polarized light which has S polarization. P polarization components are removed from the nearly linear polarized light by a polarizer, but the polarizer is not always necessary. The optical axis of the polarizer is set to be a
(Continued)

direction which allows transmitting of S polarized light. The light that has passed through the polarizer is separated into diffracted lights by a diffraction grating, and is used as the structured illumination light.

21 Claims, 11 Drawing Sheets

Related U.S. Application Data continuation of application No. 13/093,399, filed on Apr. 25, 2011, now Pat. No. 9,146,391.

(60) Provisional application No. 61/282,936, filed on Apr. 26, 2010.

(51) Int. Cl.

| | | |
|---|---|---|
| *G02B 21/36* | (2006.01) | |
| *G02B 27/58* | (2006.01) | |
| *G02B 21/06* | (2006.01) | |
| *G02B 5/30* | (2006.01) | |
| *H04N 7/18* | (2006.01) | |
| *G02B 27/10* | (2006.01) | |

(52) U.S. Cl.
CPC ......... *G02B 21/0076* (2013.01); *G02B 21/06* (2013.01); *G02B 27/58* (2013.01); *H04N 7/18* (2013.01); *G02B 21/361* (2013.01); *G02B 27/1066* (2013.01)

(58) Field of Classification Search
CPC .. G02B 21/0076; G02B 21/361; G02B 27/58; H04N 7/18
See application file for complete search history.

(56) References Cited

U.S. PATENT DOCUMENTS

| | | | | |
|---|---|---|---|---|
| 5,469,259 | A * | 11/1995 | Golby | G01B 9/02019 356/495 |
| 5,790,275 | A * | 8/1998 | Iizuka | G02B 26/12 358/296 |
| 5,823,942 | A * | 10/1998 | Toida | A61B 5/0084 600/160 |
| 5,898,500 | A * | 4/1999 | Canteloup | B24B 37/013 257/E21.528 |
| 6,239,909 | B1 | 5/2001 | Hayashi et al. | |
| 6,404,544 | B1 * | 6/2002 | Kuhn | G01B 9/04 359/371 |
| RE38,307 | E | 11/2003 | Gustafsson et al. | |
| 6,661,495 | B1 * | 12/2003 | Popovich | C09K 19/544 349/1 |
| 7,499,178 | B2 * | 3/2009 | Kawasaki | G01B 9/02019 356/495 |
| 7,848,017 | B2 * | 12/2010 | Ouchi | G02B 21/14 359/384 |
| 9,146,391 | B2 | 9/2015 | Ouchi et al. | |
| 2004/0017567 | A1 * | 1/2004 | Loicht | G01J 3/42 356/326 |
| 2004/0189979 | A1 * | 9/2004 | Fujimura | G01N 21/474 356/73 |
| 2006/0061712 | A1 * | 3/2006 | Abe | G02B 27/283 349/113 |
| 2006/0126067 | A1 | 6/2006 | Sirat et al. | |
| 2006/0146340 | A1 * | 7/2006 | Szwaykowski | G01B 9/02081 356/495 |
| 2006/0262319 | A1 * | 11/2006 | Gatt | G01H 9/00 356/492 |
| 2009/0168613 | A1 * | 7/2009 | Sirat | G02B 1/08 369/18 |
| 2010/0157422 | A1 * | 6/2010 | Ouchi | G02B 21/365 359/385 |
| 2010/0246368 | A1 * | 9/2010 | Oto | G03B 21/2073 369/112.23 |

FOREIGN PATENT DOCUMENTS

| | | |
|---|---|---|
| WO | 2004/064969 A1 | 8/2004 |
| WO | 2009/031418 A1 | 3/2009 |

OTHER PUBLICATIONS

"Waveplate, Quarter Wave plate, Half Wave Plate, Zero-order Wave Plate, Waveplates". Red Optronics. Sep. 29, 2008. http://web.archive.org/web/20080929174759/http://www.redoptronics.com/waveplate.html.
Oct. 8, 2013 Extended European Search Report issued in European Patent Application No. 11774607.3.
Jul. 19, 2011 Search Report issued in International Patent Application No. PCT/JP2011/002375.
Jul. 19, 2011 Written Opinion issued in International Patent Application No. PCT/JP2011/002375.
Nov. 6, 2012 International Preliminary Report on Patentability issued in International Patent Application No. PCT/JP2011/002375.
Apr. 16, 2013 Office Action issued in U.S. Appl. No. 13/093,399.
Oct. 22, 2013 Office Action issued in U.S. Appl. No. 13/093,399.
Apr. 3, 2014 Office Action issued in U.S. Appl. No. 13/093,399.
Sep. 10, 2014 Office Action issued in U.S. Appl. No. 13/093,399.
May 26, 2015 Notice of Allowance issued in U.S. Appl. No. 13/093,399.
Nov. 4, 2016 Office Action issued in U.S. Appl. No. 14/834,755.
Dec. 18, 2017 Office Action issued in U.S. Appl. No. 14/834,755.
Jul. 16, 2018 Office Action issued in U.S. Appl. No. 14/834,755.
Feb. 8, 2019 Office Action issued in U.S. Appl. No. 14/834,755.
Feb. 28, 2019 Office Action issued in European Patent Application No. 11774607.3.
Mar. 28, 2016 Requirement for Restriction/Election issued in U.S. Appl. No. 14/834,755.
May 11, 2017 Office Action issued in U.S. Appl. No. 14/834,755.
Aug. 5, 2019 Notice of Allowance issued in U.S. Appl. No. 14/834,755.

* cited by examiner

STRUCTURED ILLUMINATION MICROSCOPE APPARATUS AND AN IMAGE FORMING APPARATUS

This is a Continuation of U.S. patent application Ser. No. 14/834,755 filed Aug. 25, 2015 which is a Continuation of U.S. patent application Ser. No. 13/093,399 filed Apr. 25, 2011 (now U.S. Pat. No. 9,146,391), which claims the benefit of U.S. Provisional Application No. 61/282,936 filed Apr. 26, 2010. The disclosure of each of the prior applications is hereby incorporated by reference herein in its entirety.

BACKGROUND

The present invention relates to a structured illumination microscope device and an image forming apparatus.

In the field of observation and measurement of the microstructures of samples, observation at higher spatial resolution is demanded. As a method to improve the lateral resolution of a sample, a method of modulating a sample with structured lights during photographing and demodulating the captured image by image processing is known as "structured illumination microscopy", and is disclosed in U.S. Pat. No. 6,239,909 and U.S. RE38,307, for example.

The sixth embodiment disclosed in U.S. Pat. No. 6,239,909 is an example when the structured illumination microscope apparatus is applied to a fluorescence microscope, and the optical system thereof splits the illumination light emitted from a coherent light source using such beam splitting means as a diffraction grating, then condenses the illumination beams into a pupil plane of an objective lens, and emits the illumination beams as parallel beams from the objective lens at different angles, so as to overlap around the observation object and form an interference fringe.

Because the illumination light is modulated into a fringe, diffracted lights containing spatial frequency components of the shape information of the observation object, which cannot be transferred by a conventional imaging system, can be used for image formation. And by relatively modulating the phase of the split illumination beams and moving the interference fringe on the observation object when a plurality of images are acquired, image formation based on image computing processing is enabled.

In concrete terms, phase modulation is performed by moving the diffraction grating vertically to the optical axis, or in another example, by inserting a wedge prism into one of the illumination paths, and moving this wedge prism in a direction vertical to the optical axis.

According to the method disclosed in U.S. RE38,307, illumination light from the coherent light source is guided using an optical fiber, and is split by such beam splitting means as a diffraction grating, and then the illumination beams are condensed into a pupil plane of the objective lens so as to form an interference fringe near the observation object. Because the illumination light is modulated into a fringe, the high frequency components of the shape information of the observation object, which cannot be transferred by a conventional imaging system, can be used for image formation. And a plurality of images are captured in the same manner, and image formation based on image computing processing is performed.

According to this method, in order to create one image, not only a plurality of images are acquired with phase-modulated structured illumination, but also images are acquired with changing the direction of the structured illumination. This is because the high frequency components can be used for image formation only when the structure has the same direction as the direction of the structured illumination, so in order to restore the shape of the sample which extends two-dimensionally, a plurality of images must be acquired with changing the direction of the structured illumination, and be combined.

In this structured illumination, it is normally desirable that the beams with respect to the interference surface have S polarization in order to allow two or more beams to interfere. Because the contrast of the interference fringe when beams with S polarization is 1, regardless of the incident angle, the contrast when beams enter in the P polarization state attenuates in proportion to $\cos(\Delta\theta)$, where $\Delta\theta$ is the crossing angles of the beams. Since the observed light is the sum of S polarization and P polarization, contrast to be observed decreases as P polarization attenuates. At $\Delta\theta>90°$, the numeric value of the contrast of P polarization becomes negative, which means that the brightness/darkness of the interference fringe inverts, and the interference fringe generated by S polarization is cancelled, which is not desirable.

In particular, the structured illumination microscope is a technology used to obtain high resolution, and it is preferable that the NA of the objective lens to be used is as high as possible, and the pitch of the structured illumination is as short as possible. As a result, the beams for the structured illumination enter into the sample at a large angle, so if a P polarization component exists, attenuation of the P polarization is major since the above mentioned $\Delta\theta$ is large, which becomes the cause of deterioration of the structured illumination contrast.

In order to address this problem, a non-polarization state is created by allowing light from the light source to pass through a diffuser or vibrating multi-mode optical fibers, then light is nearly linear polarized using a polarizer, which is installed near the diffraction grating and which rotates coaxially with the diffraction grating, so as to enter with S polarization onto the sample.

As a result, ideal structured illumination contrast is obtained, but the polarizer blocks about half of the light power, which lowers utilization efficiency of the light to 50%.

SUMMARY

In view of the foregoing, it is an object of the present invention to provide a structured illumination microscope of which utilization efficiency of the light from the light source is high.

It is another object of the present invention to provide an image forming apparatus of which utilization efficiency of the light from the light source is high.

A first aspect of the present invention is a structured illumination microscope apparatus comprising: an illumination optical system which includes a beam splitter rotatably disposed near a conjugate position of a sample and splitting a beam from a light source into a plurality of beams, and which irradiates illumination light that has been spatially modulated by allowing the plurality of beams to interfere near a sample surface; an imaging optical system which forms an image of diffracted light generated from the sample on an image capturing surface of an image capturing device; an image processing device which generates a sample image by processing a plurality of images captured by the image capturing device each time a phase of the spatially modulated illumination light is changed; a first quarter wave plate which is disposed between the light source and the beam splitter, and of which direction of a fast axis is relatively fixed with respect to a polarization direction of the light from the light source; and a second quarter wave plate which is disposed between the first quarter wave plate and the beam splitter, and is rotatable coaxially with the rotation axis of the beam splitter with the same rotation angle as that of the beam splitter.

A second aspect of the present invention is a structured illumination microscope apparatus comprising: an illumination optical system which includes a beam splitter disposed near a conjugate position of a sample, and splitting a beam from a light source into a plurality of groups of beams, of which splitting directions are different, around an optical axis; and a beam selector for selecting and transmitting only one arbitrary group of beams out of the plurality of groups of beams, and which irradiates illumination light that has been spatially modulated by allowing the plurality of beams included in the one group of beams to interfere near a sample surface; an imaging optical system which forms an image of diffracted light generated from the sample on an image capturing surface of an image capturing device; an image processing device which generates a sample image by processing a plurality of images captured by the image capturing device each time a phase of the spatially modulated illumination light is changed; a first quarter wave plate which is disposed between the light source and the beam splitter, and of which direction of a fast axis is relatively fixed with respect to a polarization direction of the light from the light source; and a second quarter wave plate which is disposed between the beam splitter and the beam selector, and of which rotation angle from the optical axis is relatively fixed with respect to the beam selector.

A third aspect of the present invention is an image forming apparatus comprising, light source means for producing linearly polarized light, light splitting means, placed in a position that is optically conjugate to a specimen for splitting light from the light source means, a periodic structured light means for providing a periodic structured light on a specimen by interference of the split light, shifting means for shifting the phase of the periodic structured light, producing means for producing images of light from the specimen onto an image plane, detecting means for detecting and recording the images of the specimen in the image plane, and processing means for producing a reconstruction of the specimen by processing the recorded images which are taken with different phase of the periodic structured light, wherein a first quarter wave retarding means is located between the light source means and the light splitting means, the first quarter wave retarding means is mounted in a fixed orientation relative to the polarization of the light source, to produce circularly polarized light, and a second quarter wave retarding means is located between the first quarter wave retarding means and the light splitting means, the second quarter wave retarding means is enabled to co-rotate with the light splitting means.

A fourth aspect of the present invention is an image forming apparatus comprising, light source means for producing linearly polarized light, light splitting means placed in a position that is optically conjugate to a specimen, for splitting the light from the light source means into a plurality of beams of light, light selecting means to select a subset of beams from among the plurality of beams of light, a periodic structured light means for providing a periodic structured light on the specimen by interference of the split light, producing means for producing images of light from the specimen onto an image plane, detecting means for detecting and recording the images of the specimen in the image plane, and processing means for producing a reconstruction of the specimen by processing the recorded images which are taken with different phase of the periodic structured light, wherein a first quarter wave retarding means is located between the light source means and the light splitting means, the first quarter wave retarding means is mounted in a fixed orientation relative to the polarization of the light source, to produce circularly polarized light, and a second quarter wave retarding means is located between the first quarter wave retarding means and the specimen, the second quarter wave retarding means is enabled to co-rotate with the light selecting means.

A fifth aspect of the present invention is an illumination optical system which includes a beam splitter rotatably disposed near a conjugate position of a sample and splitting a beam from a light source into a plurality of beams, and which irradiates illumination light that has been spatially modulated by allowing the plurality of beams to interfere near a sample surface, comprising: a first quarter wave plate which is disposed between the light source and the beam splitter, and of which direction of a fast axis is relatively fixed with respect to a polarization direction of the light from the light source; and a second quarter wave plate which is disposed between the first quarter wave plate and the beam splitter, and is rotatable coaxially with the rotation axis of the beam splitter with the same rotation angle as that of the beam splitter.

A sixth aspect of the present invention is an illumination optical system which includes a beam splitter disposed near a conjugate position of a sample, and splitting a beam from a light source into a plurality of groups of beams, of which splitting directions are different, around an optical axis; and a beam selector for selecting and transmitting only one arbitrary group of beams out of the plurality of groups of beams, and which irradiates illumination light that has been spatially modulated by allowing the plurality of beams included in the one group of beams to interfere near a sample surface, comprising: a first quarter wave plate which is disposed between the light source and the beam splitter, and of which direction of a fast axis is relatively fixed with respect to a polarization direction of the light from the light source; and a second quarter wave plate which is disposed between the beam splitter and the beam selector, and of which rotation angle from the optical axis is relatively fixed with respect to the beam selector.

Further applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limiting of the present invention.

DESCRIPTION OF THE PREFERRED EMBODIMENTS

Figure 1:
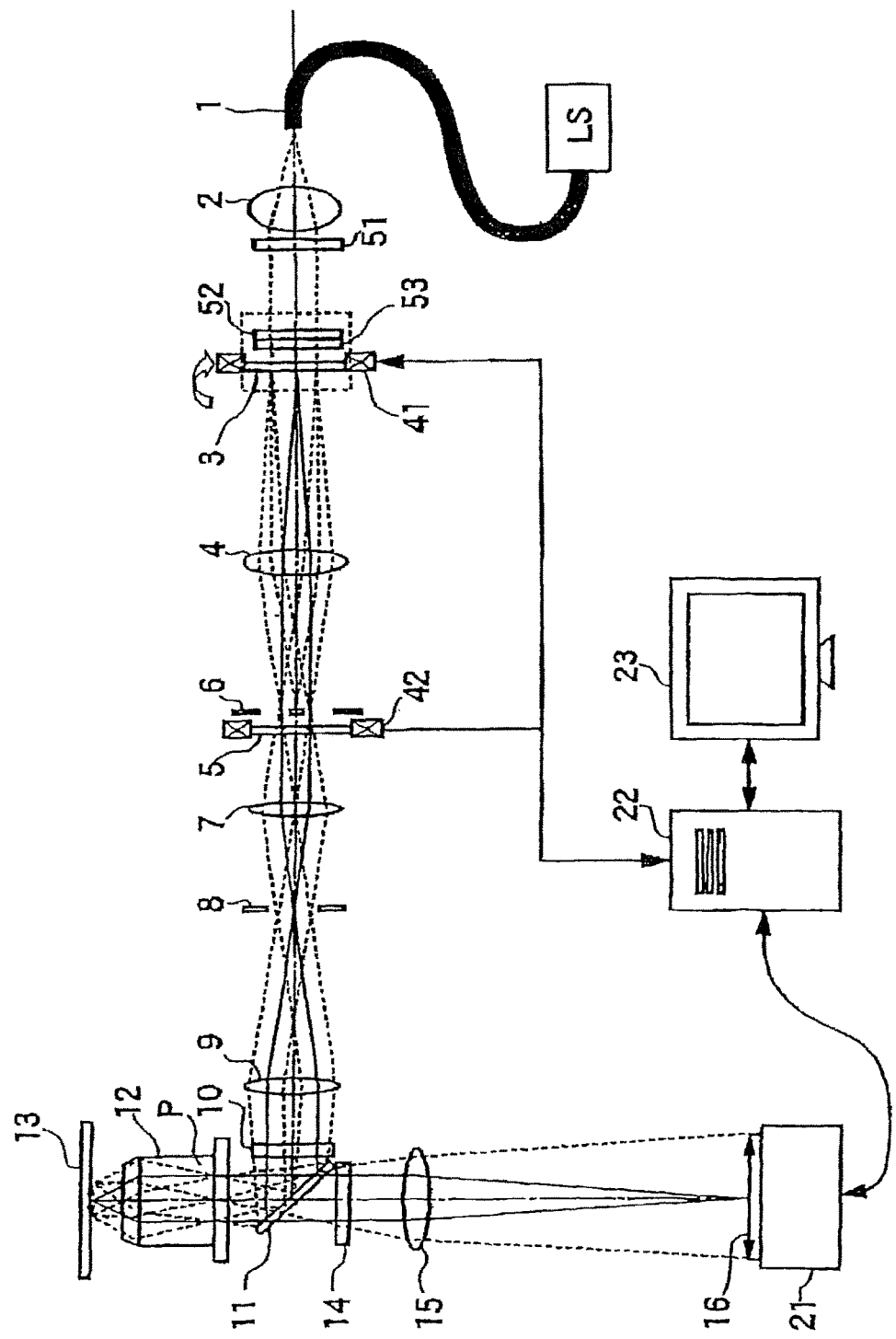
FIG. 1 is a diagram depicting an overview of the optical system of a structured illumination microscope apparatus according to a first embodiment of the present invention.

Examples implementing the present invention will now be described with reference to the drawings, but this description does not limit the scope of the present invention. FIG. 1 is a diagram depicting an overview of an optical system of a structured illumination microscope apparatus according to a first embodiment of the present invention.

A coherent light from a light source LS is guided via an optical fiber 1, and is converted into parallel lights by a collector lens 2. The illumination light from the emitting end of the optical fiber 1 passes through a quarter wave plate 51 (first quarter wave plate), which is secured such that a fast axis is +45° inclined from the polarization direction thereof. Here the fast axis of the quarter wave plate refers to a direction of polarization when the phase lag becomes the least when a polarized light passes through the quarter wave plate. As a result, the illumination light becomes circular polarized in general. The inclination of the fast axis need not accurately be +45°, but may have about a ±5.7° margin of error.

This tolerance corresponds to a 1% intensity variance.

The circular polarized light passes through a quarter wave plate 52 (second quarter wave plate), which is secured in a diffraction grating 3 and can rotate with the diffraction grating 3, and becomes nearly linear polarized light. If the direction of the fast axis of the quarter wave plate 52 is set to be −45° from the ruling direction of the diffraction grating 3, then the circular polarized light can be converted into nearly linear polarized light with which S polarization for the sample surface is generated with respect to the diffraction direction of the diffraction grating. The direction of the fast axis need not be exactly +45°, but may have about a ±5.7° margin of error.

In this way, a roughly perfect S polarization for the sample surface can be implemented, but if the remaining P polarization for the sample surface is further removed, a polarizer 53, which has a transmission polarization direction that is in parallel with the ruling direction of the diffraction grating 3, may be disposed.

For the light source, a laser is used since the illumination light must be coherent. Therefore the polarization state at the emission end of the optical fiber 1 is roughly a linear polarization unless scrambling is performed, but it is preferable to pass this light through the polarizer 53 so as to remove the P polarization components, which slightly remain due to the angle error and phase error of the quarter wave plates 51 and 52. In the present example, a single mode fiber, maintaining the polarization plane, is used for the optical fiber 1.

The diffraction grating 3 is a beam splitting means. For the beam splitting means, other optical elements, such as a prism, can be used unless the elements do not interrupt the coherency. In the present example, the direction of the diffracted light can be changed by rotating the diffraction grating 3. A lens 4 and a lens 7 are set so that the image of the diffraction grating 3 is formed on a conjugate plane of the sample, and a field stop 8 is disposed at a position where the image of the diffraction grating 3 is formed. A conjugate plane of a pupil of an objective lens 12 is formed by the lens 4 so as to make distinct light spots for each order of diffraction, and a phase plate 5 and beam block 6 are disposed near the pupil conjugate plane. The diffraction grating 3 has a one-dimensional periodic structure in a vertical direction to the sheet of FIG. 1. The periodic structure may be created by density (transmittance) or by step difference (phase difference), but phase difference is preferable because diffraction efficiency of ±1-order beams is high.

In the present example, only ±1st order beams are used for the illumination light, and 0th order beam and 2nd or higher order beams are cut by the beam block 6. Therefore the 0th order beam indicated by the solid line does not actually exist after the beam block 6, but in FIG. 1, only the optical axis is shown to make it easier to understand ray trace.

The phase plate 5 disposed near the conjugate plane of the pupil of the objective lens 12 has a thickness of a transparent substrate, or has a thin film with controlled thickness deposited, so that an appropriate phase lag is generated in one or both of the incident beams (±1st order beam). Thereby a phase difference is generated between +1st order beam and −1st order beam.

The lights that have passed through the field stop 8 are converted into parallel lights by a field lens 9, and condensed on the pupil plane P of the objective lens 12 for each order of diffraction, via an excitation filter 10 and a dichroic mirror 11, and thus each beam from the objective lens 12 becomes a parallel beam, irradiating onto the surface of the sample 13. Because of mutual coherent beams, the surface of the sample 13 is illuminated with an interference fringe pattern. This illumination light having a fringe structure is called a "structured light", and this illumination method is called a "structured illumination".

If the sample 13 is illuminated by the structured illumination light, the structured illumination and the structure of the sample 13 generate a moiré fringe, but this moiré fringe containing high frequency information of the sample is a still lower frequency than the original frequency, so the moiré fringe can be imaged by the objective lens 12.

The lights (fluorescent) from the sample 13 are converted into parallel lights by the objective lens 12, passed through the dichroic mirror 11 and a barrier filter 14, and form a sample image on an image capturing surface 16 of image capturing means 21 such as a CCD camera by a tube lens 15. This sample image is captured by an image storage and computing device 22.

As mentioned above, the captured images are the result after the sample are modulated by structured illumination. So the sample image can be obtained first by processing the captured images using a known image computing means of the image storage and computing device 22, next by demodulating, and then by restoring the image, after which an ultra high resolution image of the sample can be displayed on the image display device 23.

When the original image is restored by image processing, images are captured with modulating the phase of the structured illumination three or more times for the same sample. This is because three unknown parameters of the 0th order component, the +1st order component and the −1st order component, out of the information on the frequency components of the sample diffracted by the structured illumination, exist in the modulated image and information more than the unknown quantity is required in order to determine the unknown quantity in computing.

Such imaging, computing/restoration and visualizing technologies are known to be incorporated in conventional structured illumination microscope apparatus, and are not directly related to the present invention, so a detailed description thereof is omitted.

In the case of the present example, phase modulation is performed by rotating the phase plate 5, but phase modulation may be performed by translationally driving the diffraction grating 3 in a direction to generate diffraction. In this case the phase plate 5 is unnecessary.

Figure 2:
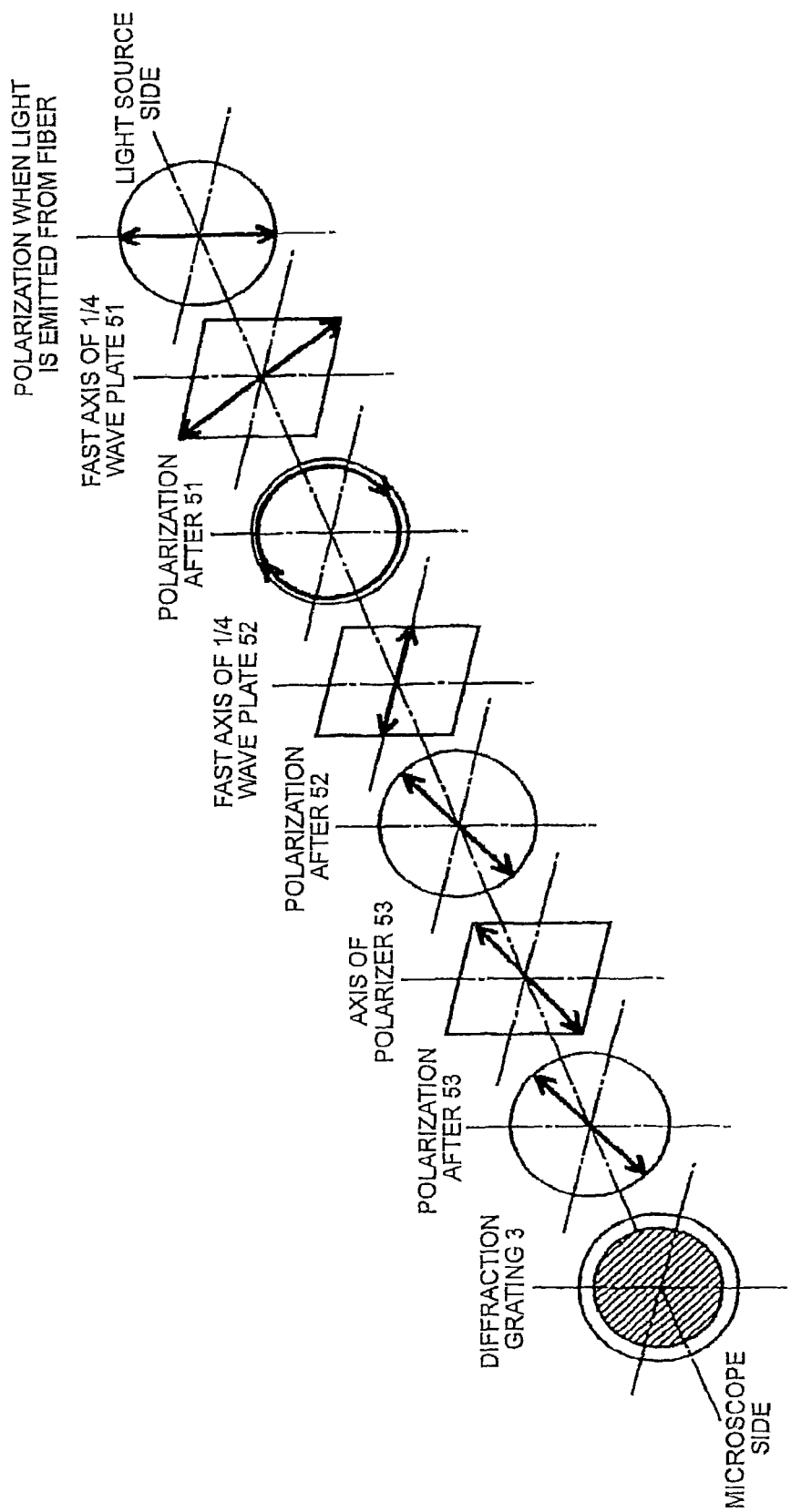
FIG. 2 is a diagram depicting a direction of an axis of each optical element and a polarization state of beams according to the first embodiment.

FIG. 2 is a diagram depicting a direction of an axis of each optical element of this example and the polarization state of the beam. In FIG. 2, a circle indicates a beam, and an arrow therein indicates a direction of polarization. A square indicates an optical element, and an arrow therein indicates an axis direction.

Polarized light which is from the optical fiber 1 passes through the first quarter wave plate 51, and becomes a circular polarized light. A fast axis of the quarter wave plate 51, indicated in FIG. 2, refers to a direction of polarization in which phase lag is shortest when polarized light passes through the quarter wave plate. This is the same for the fast axis of the quarter wave plate 52 indicated in FIG. 2.

The relationship of the direction of polarization when the light is from the optical fiber 1 and the direction of the fast axis of the first quarter wave plate 51 is that the fast axis of the first quarter wave plate 51 is +45° inclined from the direction of polarization of the light from the optical fiber 1, as mentioned above.

The circular polarized light entered from the second quarter wave plate 52 is converted into a nearly linear polarized light which has S polarization for the sample surface. As mentioned above, the direction of the fast axis of the quarter wave plate 52 is −45° from the pattern direction of the diffraction grating 3.

The axis of the polarizer 53 is in a direction to transmit S polarized light for the sample surface. In the nearly linear polarized light, slightly remaining the P polarization components are removed by the polarizer 53, but the polarizer 53 is not always necessary. The light that has passed through the polarizer 53 is separated into diffracted lights by the diffraction grating 3.

It is preferable to use the quarter wave plate 51 and quarter wave plate 52 matching the wavelength of the light source, since the phase difference is shifted from the original quarter wave if the wavelength of the light source changes, but a wideband wave plate of which phase variance with respect to the quarter wave is small in wide wavelengths may be used. In this case as well, the phase difference of an ordinary beam and extraordinary beam should be within 90°±5° (quarter wave ±1/72 wavelength). The reason for this will be described with reference to FIG. 3.

Figure 3:
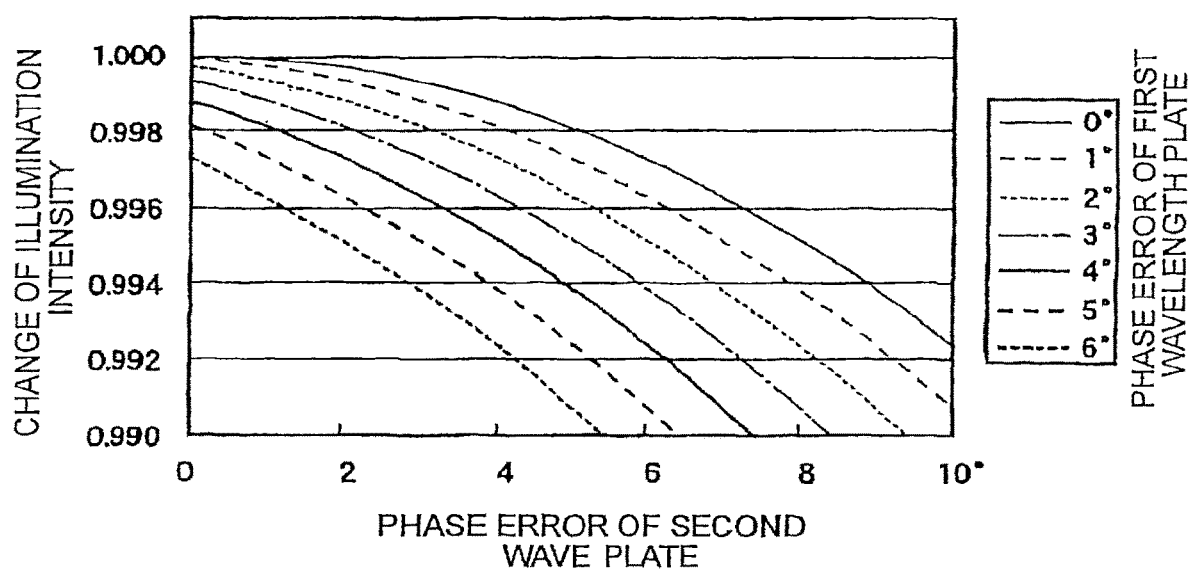
FIG. 3 is a graph showing the relationship of the phase error of the first quarter wave plate, the phase error of the second quarter wave plate and the drop in illumination intensity of nearly linear polarized light.

In the graph of FIG. 3, the abscissa (unit: degrees) is a difference from the 90° phase difference (quarter wave) generated by the quarter wave plate 52, and a change of light intensity, when nearly linear polarized light is obtained, is plotted, with respect to the differences from the 90° phase difference generated by the quarter wave plate 51. The lines in FIG. 3 show the difference (unit: degrees) from the 90° phase difference generated by the quarter wave plate 51.

As FIG. 3 shows, as the difference from 90° (quarter wave) increases, light intensity decreases in both the quarter wave plates, but if the phase error is kept within 5° in both quarter wave plates, the change of light intensity when nearly linear polarized light is obtained can be within 1%. This means that in order to keep the change of light intensity when nearly linear polarized light is obtained within 1%, the phase errors between the ordinary beam and extraordinary beam after passing through the phase plate should be within ±5% in both of the phase plates.

Figure 4:
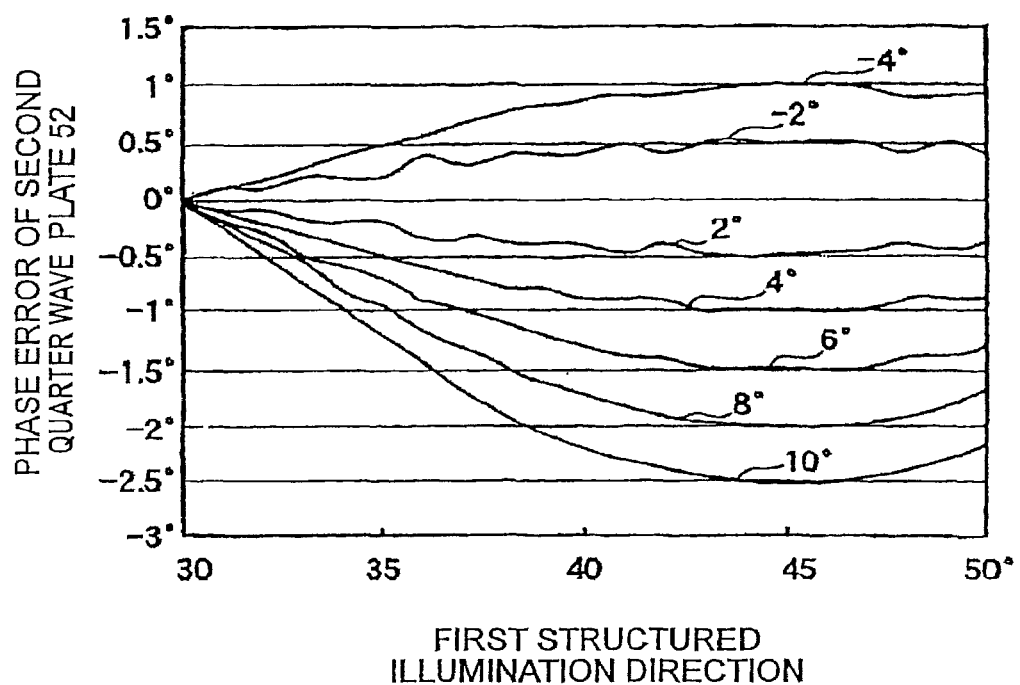
FIG. 4 is a graph showing the relationship of the phase error of the first quarter wave plate, the phase error of the second quarter wave plate, and the first structured illumination direction, which minimizes the drop in illumination intensity of nearly linear polarized light.

However the smaller the change in light intensity when the nearly linear polarized light is obtained is, the better. Therefore the relationship between the phases of the two quarter wave plates, which minimizes the change in light intensity when nearly linear polarized light is obtained, was determined by simulation. The result is now described with reference to FIG. 4. In FIG. 4, the abscissa indicates a first direction θ1 (unit: degrees) of the structured illumination (the first direction out of many directions in which structured illumination is performed generally in the structured illumination microscope apparatus), and each line in FIG. 4 corresponds to the difference (deviation) φ1 (unit: degrees) from the 90° phase difference of the first quarter wave plate 51. The ordinate indicates the difference (deviation) φ2 (unit: degrees) from the 90° phase difference of the second quarter wave plate 53.

Each line shows the locus of the relationship between each parameter which minimizes the drop in the illumination light intensity when the nearly linear polarized light is obtained, while changing each parameter. For example, if φ1=10° when the first structured illumination direction θ1 is 45°, then the change of the light intensity when the nearly linear polarized light is obtained can be minimized if φ2=−2.5°. In the same manner, if φ1=6° when the first structured illumination direction θ1 is 35°, then the change of light intensity when the nearly linear polarized light is obtained can be minimized if φ2=−0.07°.

The relational expression of θ1, φ1 and φ2 created from this graph using the recurrence formula is as follows.

$$\phi2 = 0.25 \times \phi1 \times \sin(6 \times \theta1)$$

If some deviation from the optimum value is allowed, the relationship of θ1, φ1 and φ2 can be determined such that the following expression (1) is established.

$$0.20 \times \phi1 \times \sin(6 \times \theta1) \leq \phi2 \leq 0.30 \times \phi1 \times \sin(\theta1) \tag{1}$$

Then the change of light intensity when the nearly linear polarized light is obtained can be controlled to be within 0.5%.

In order to establish the relationship between φ1 and φ2 in expression (1), a wideband wave plate should be used. FIG.

Figure 5:
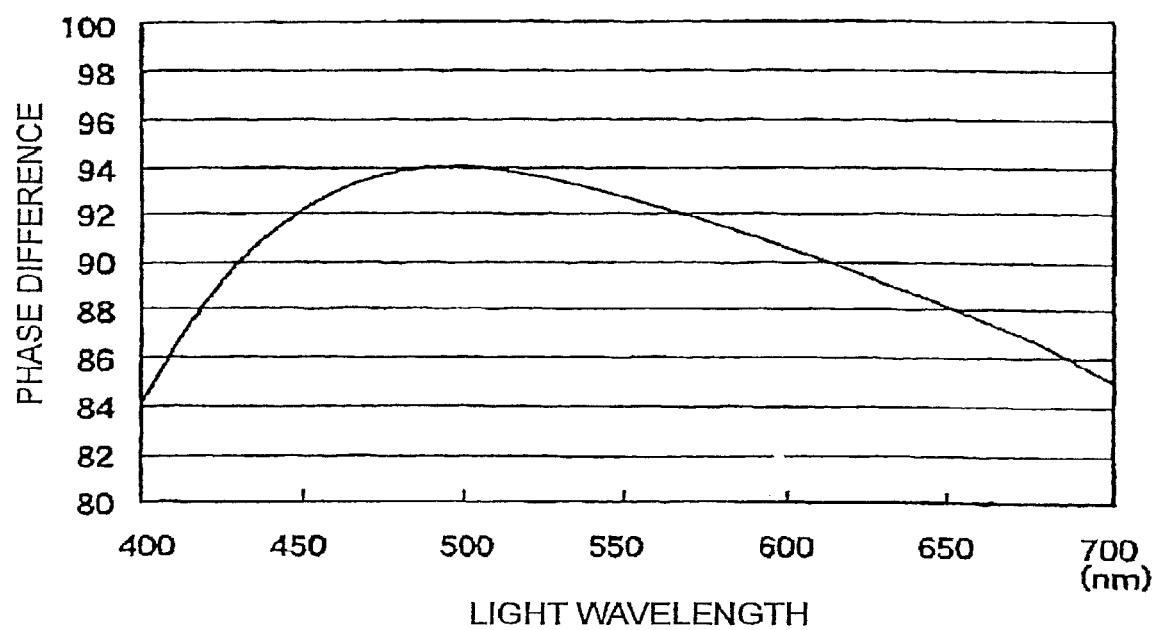
FIG. 5 is a graph showing the characteristics of an example of a wideband wave plate (achromatic wave plate)

5 shows an example of the characteristics of a wideband wave plate (achromatic wave plate). The abscissa indicates the wavelength (unit: nm) and the ordinate indicates the phase difference. As FIG. 5 shows, in the achromatic wave plate, the inclination of the phase difference with respect to the wavelength is generally sharper at the shorter wavelength side, and milder at the longer wavelength side, compared with the wavelength at which the phase difference is the maximum.

Figure 6:
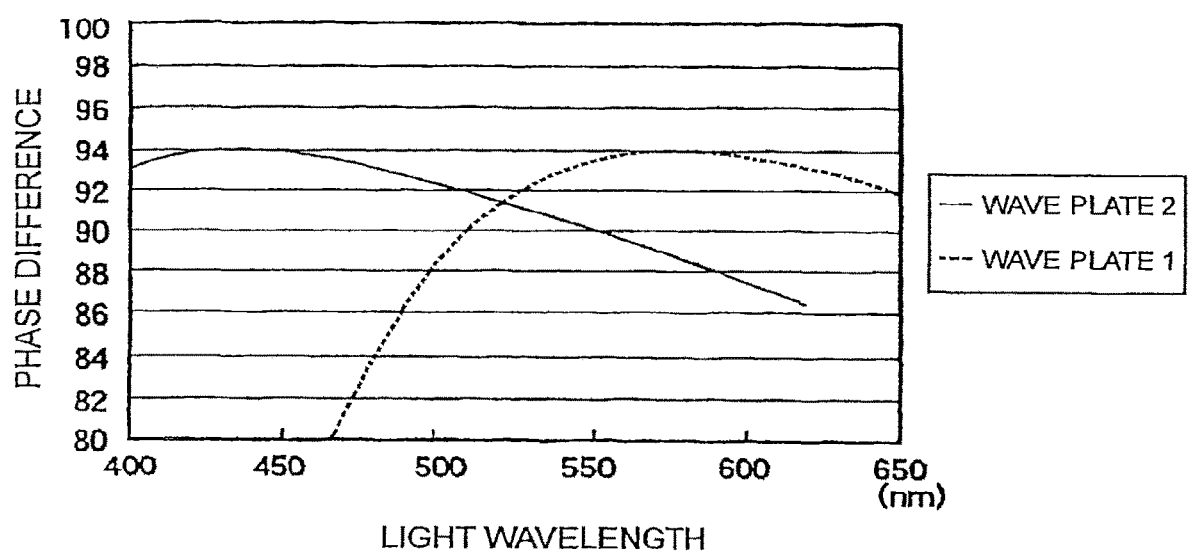
FIG. 6 is a graph depicting an example of the characteristics of two quarter wave plates having different design waves.

Therefore as FIG. 6 shows, a relationship close to Expression (1) can be easily established in the 460 nm to 560 nm wavelength range, if two quarter wave plates having different design wavelengths are manufactured (units of the ordinate and abscissa in FIG. 6 are the same as those in FIG. 5), and the wave plate 1 (characteristics of the dashed line) is used as the wave plate 51 and the wave plate 2 (characteristics of the solid line) is used as the wave plate 52. As a result, if wideband wave plates that satisfy a relationship close to expression (1) are manufactured and used in combination, attenuation of the brightness of the structured illumination light can be prevented in a wide wavelength band.

Figure 7:
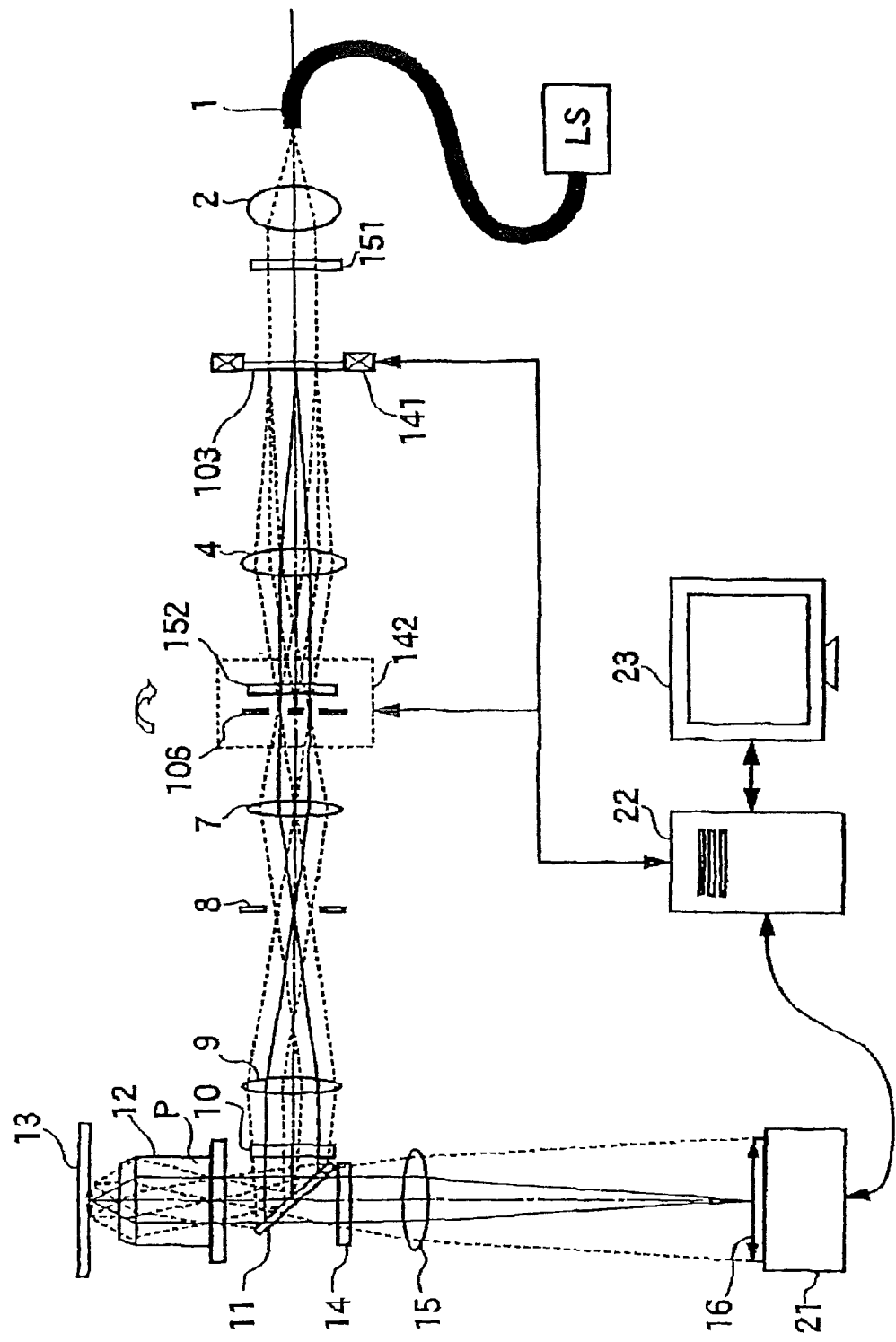
FIG. 7 is a diagram depicting an optical system of a structured illumination microscope apparatus according to a second embodiment of the present invention.

FIG. 7 is a diagram depicting an overview of an optical system of a structured illumination microscope apparatus according to a second embodiment of the present invention. The only differences between the second embodiment and the first embodiment are the structure of the diffraction gratings 3 and 103, the positions of the quarter wave plates 52 and 152, and the use of a beam selector 106. Other elements that are the same as the elements of FIG. 1 are denoted with the same reference symbols, and description on portions having the same functions may be omitted.

Figure 8A:
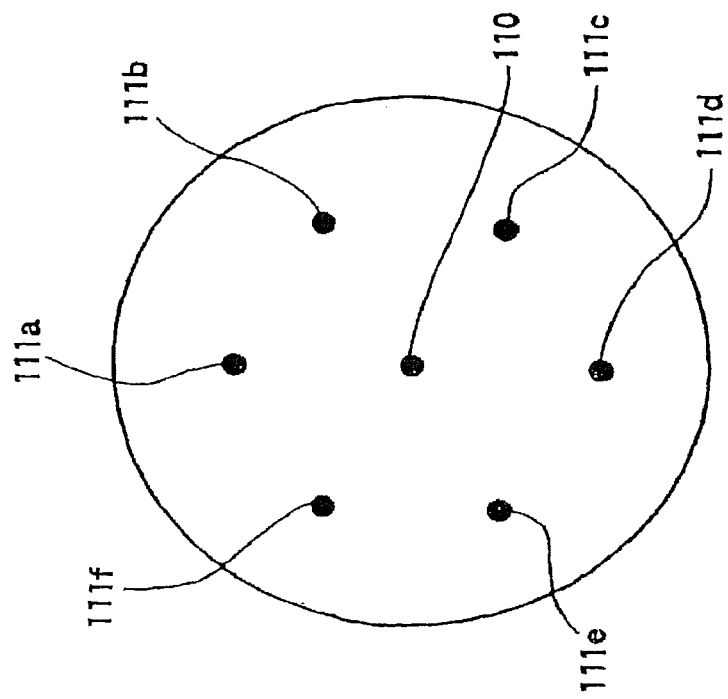
FIGS. 8A and 8B are diagrams depicting a diffraction grating and condensing positions of the diffracted light according to the second embodiment of the present invention.

The second embodiment uses a diffraction grating 103 having a structure shown in FIG. 8A, instead of the diffraction grating 3 of the first embodiment. This diffraction grating 103 has a periodic structure in three directions with 60° intervals, and has a concave and convex triangular prisms arranged alternately. If a white triangle in FIG. 8A is a concave portion, then a black triangle is a convex portion. The apex angle of the triangles need not be exactly 60°, but 60° is preferable.

Figure 8B:
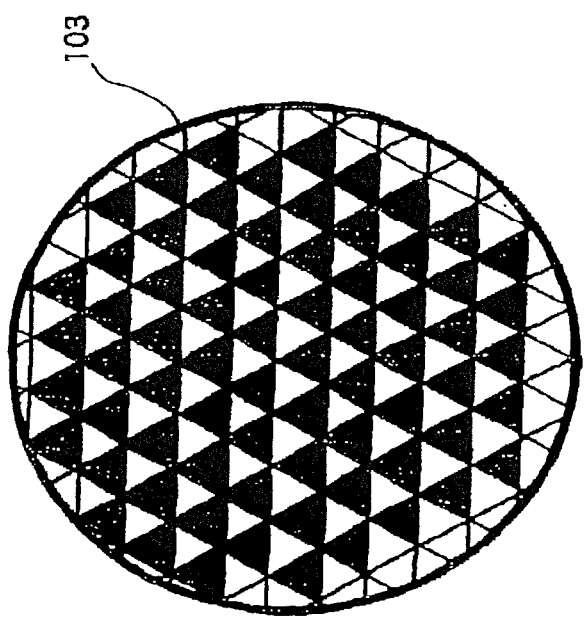

FIG. 8B shows a state when the 0-order light and ±1-order lights generated by the diffraction grating 103 are condensed at the conjugate positions of the pupil via the lens 4 in FIG. 7. 110 in FIG. 8B shows the 0th order's spot, and 111a to 111f are ±1st order's spot.

Figure 9:
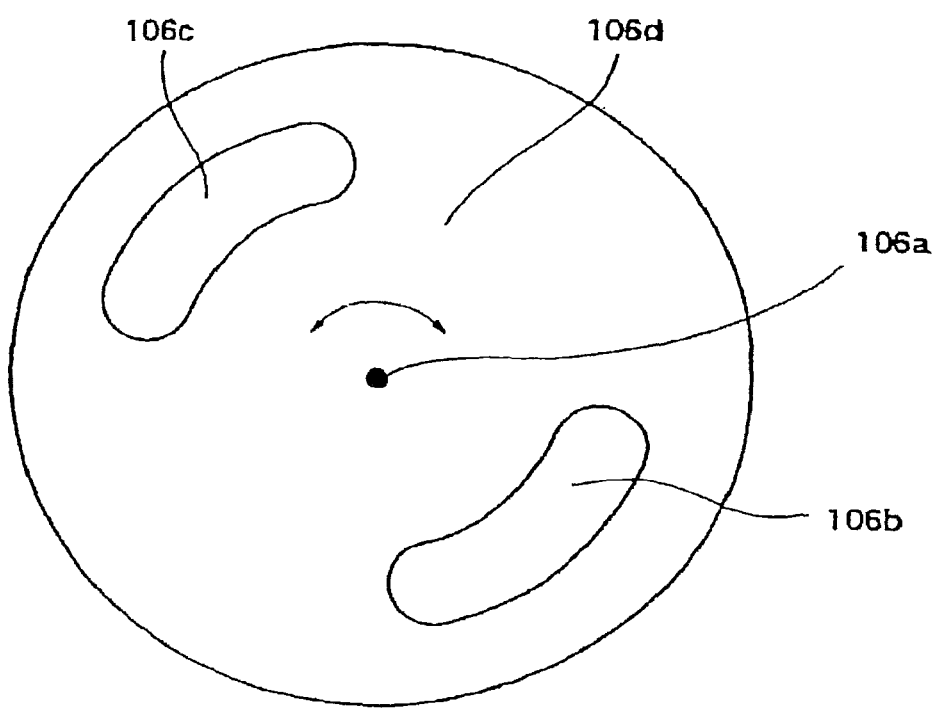
FIG. 9 is a diagram depicting an overview of a beam selector according to the second embodiment of the present invention.

In the second embodiment, a beam selector 106 having a structure shown in FIG. 9 is used instead of the above mentioned beam block 6 of the first embodiment. The beam selector 106 has a mechanism whereby the beam selector 106 rotates with its center 106a as the center of rotation. Areas 106b and 106c are holes or transparent with a glass of high transmittance. Each time the beam selector 106 rotates, only a pair of beams, out of the pairs of beams 111a and 111d, 111b and 111e, and 111c and 111f shown in FIG. 8B pass through the areas 106b and 106c respectively, and beams other than this pair are blocked by the shielding unit. The beam selector 106 is rotated by a rotation stage 142 shown in FIG. 7, by which one out of the three sets of ±1st order beams generated by the diffraction grating 103 is selected and allowed to pass through at a time so as to be used for the structured illumination. The behavior of the selected two beams after the lens 7 are the same as the first embodiment. The 0th order diffracted light is blocked by the beam selector 106, and thereafter does not exist, but is still shown to clearly indicate the course of the beam, which is the same as FIG. 1.

If a timing of the areas 106b and 106c selecting the beams, and a timing of the imaging means capturing an image, are synchronized, the beam selector 106 can rotate continuously at a predetermined speed. For example, as shown in FIG. 9, the shape of the edge of the beam selector is matched with the areas 106b and 106c, and the timing of detecting the edge is measured by a timing sensor. In the case of the first embodiment, the diffraction grating 3 is rotated for a predetermined angle, and is then stopped to capture the image, so it may take time for settling, but in the second embodiment, an image can be captured at high-speed since continuous rotation is possible.

Figure 10:
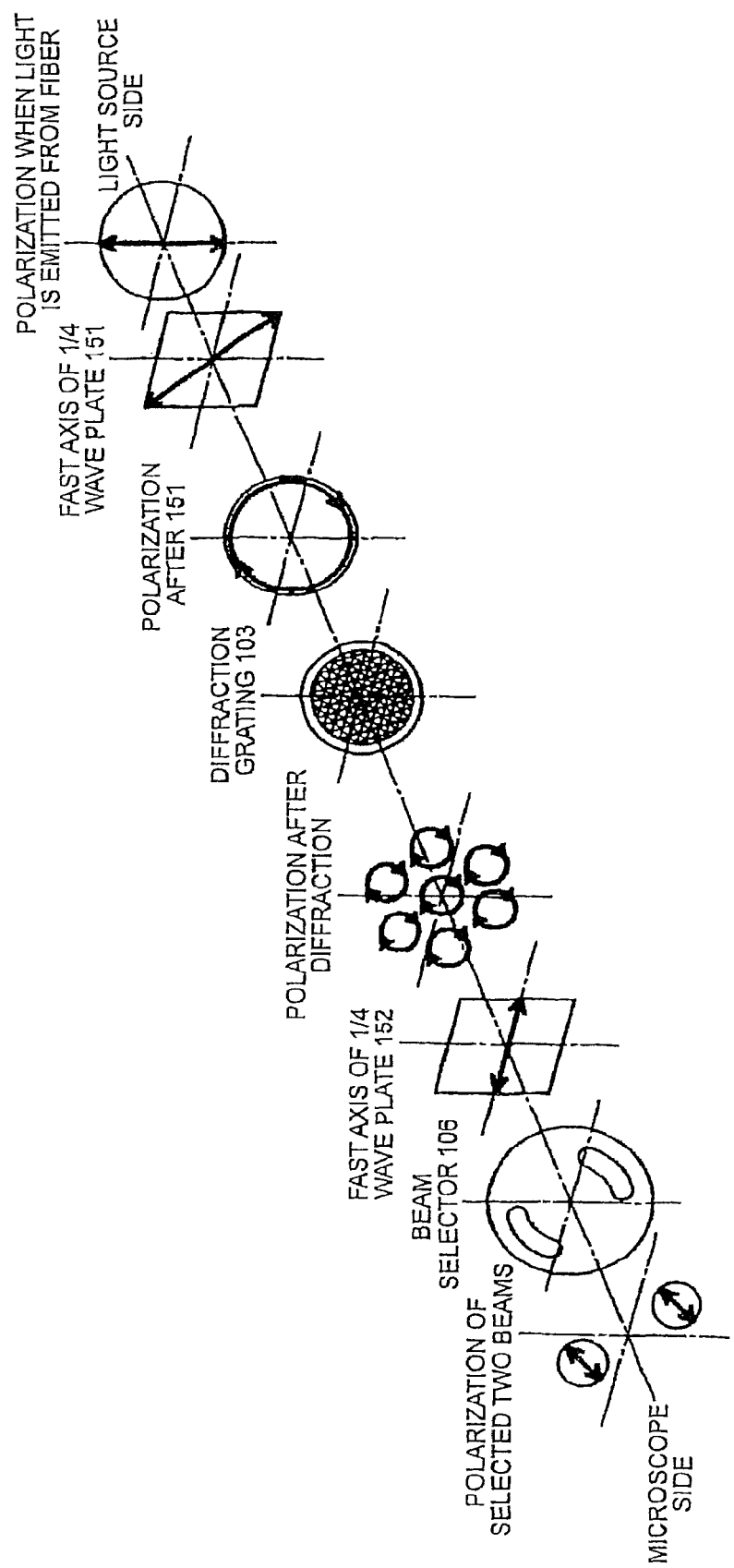
FIG. 10 is a diagram depicting a direction of an axis of each optical element and polarization state of beams according to the second embodiment of the present invention.

Now polarization control of the second embodiment will be described with reference to FIG. 7 and FIG. 10. FIG. 10 is a diagram corresponding to FIG. 2 of the first embodiment, and shows the direction of the axis of each optical element and polarization state of the beam.

If the illumination light emitted from the end of the optical fiber 1 passes through the quarter wave plate 151, which is secured with the fast axis thereof inclined at +45° from the polarization direction of the illumination light, the illumination light becomes roughly a circular polarized light. In the present example, the illumination light in the circular polarized state enters the diffraction grating 103. Then the illumination light receives the diffraction function in the circular polarized state. The second quarter wave plate 152 is disposed with the fast axis thereof inclined −45° from the polarization direction in which the selected two beams become an S polarization for the sample surface, so that the second quarter wave plate 152 rotates along with the above mentioned beam selector 106. Thereby the illumination light can be converted into a nearly linear polarized light in which the selected two beams always become S polarization for the sample surface.

Figure 11B:
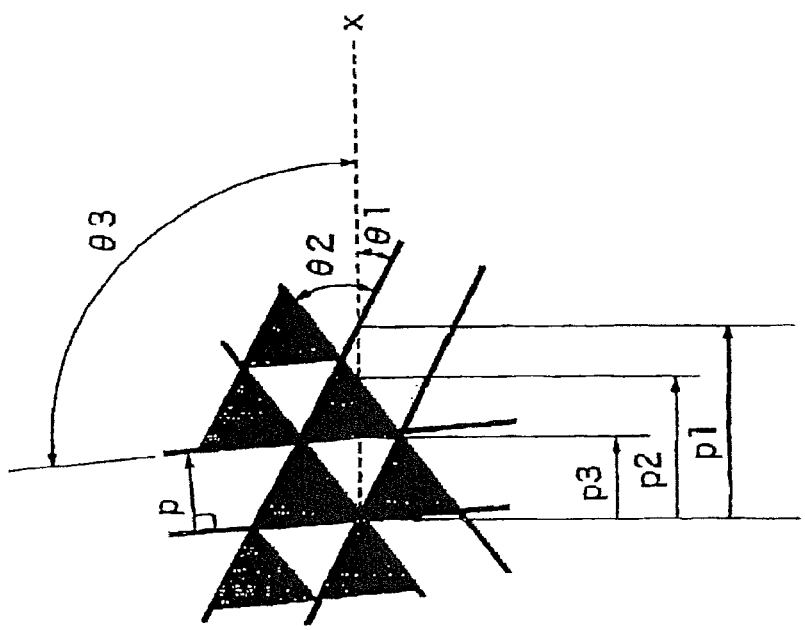
FIGS. 11A and 11B are diagrams depicting a method for phase modulation according to the second embodiment of the present invention.
Figure 11A:
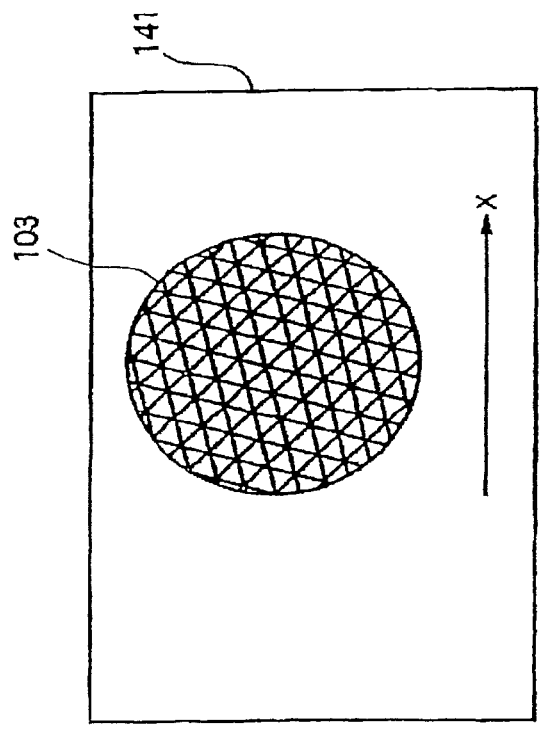

The phase modulation of the second embodiment is performed by the actuator 141 in FIG. 7. As FIG. 11A shows, the actuator 141 translationally drives the diffraction grating 103 along one axis (x direction in FIG. 11A). FIG. 11B is an enlarged view of the grating line direction and driving direction. When a pitch of the grating is p, and the angles of the grating lines with respect to the driving direction are θ1, θ2 and θ3 respectively, the converted pitches p1, p2 and p3 in the driving direction become $p1=p/\cos\theta1$ $p2=p/\cos\theta2$ $p3=p/\cos\theta3$ respectively. Therefore, for the phase modulation required for image processing, the diffraction grating is driven with ⅓ of the converted pitch (or a multiple thereof) at a time in the respective directions.

In the second embodiment, a polarizer is not used, but a polarizer may be added just like the first embodiment, in order to improve the final linear polarization degree. In this case, the polarizer is disposed after the second quarter wave plate 152 and before or after the beam selector 106 so as to be rotated together with the beam selector 106, or disposed immediately after the emission end of the optical fiber 1. The polarization direction of the polarizer is a direction in which the two beams become the S polarization state in the former case, and a direction in parallel with the polarizing direction of the optical fiber 1 in the latter case.

As described above, the polarizer is not used for creating the structured illumination light in the present invention, unless it is used as an option for removing the P polarization as noise, so almost all lights from the light source can be used for the structured illumination light in the S polarization state, and the utilization efficiency of the light can be increased.

The invention being thus described, it will be obvious that the same may be varied in many ways. Such variations are not to be regarded as a departure from the spirit and scope of the invention.

What is claimed is:

1. A structured illumination microscope system comprising:
   a beam splitter that splits a beam from a light source into a plurality of beams, the beam splitter being a diffraction grating;
   a first quarter wave plate;
   a second quarter wave plate disposed between the first quarter wave plate and the beam splitter; and
   an objective lens configured to generate an interference fringe pattern on a sample by the plurality of beams, wherein
   a fast axis of the second quarter wave plate is set at a first position when a pattern direction of the beam splitter is set at a second position,
   the fast axis of the second quarter wave plate is set at a third position that is different from the first position when the pattern direction of the beam splitter is set at a fourth position that is different from the second position, and
   the first quarter wave plate is disposed at a first axial position different from a second axial position at which the second quarter wave plate is disposed, along an axis extending through a center of the first quarter wave plate and through a center of the second quarter wave plate.

2. The structured illumination microscope system according to claim 1, wherein
   the plurality of beams are aligned in a first direction.

3. The structured illumination microscope system according to claim 1, further comprising
   a control unit that sets the fast axis of the second quarter wave plate.

4. The structured illumination microscope system according to claim 1, further comprising
   a control unit that sets the pattern direction of the beam splitter.

5. The structured illumination microscope system according to claim 1, further comprising
   a control unit that rotates the beam splitter and the second quarter wave plate.

6. The structured illumination microscope system according to claim 1, wherein
   the first quarter wave plate is disposed between the light source and the second quarter plate.

7. The structured illumination microscope system according to claim 1, wherein
   the second quarter wave plate is configured to be rotatable around an axis extending through a center of the second quarter wave plate.

8. The structured illumination microscope system according to claim 1, wherein
   the axis extending through the center of the second quarter wave plate coincides with an axis extending through a center of the diffraction grating, and the second quarter wave plate is configured to be rotatable coaxially with the diffraction grating.

9. The structured illumination microscope system according to claim 1, wherein
   a direction of a fast axis of the first quarter wave plate is +45°±5.7° with respect to a polarization direction of incoming illumination light.

10. The structured illumination microscope system according to claim 1, wherein
    a direction of the fast axis of the second quarter wave plate is −45°±5.7° with respect to the pattern direction of the beam splitter.

11. The structured illumination microscope system according to claim 1, further comprising
    a polarizer.

12. The structured illumination microscope system according to claim 11, wherein
    the polarizer is disposed downstream of the second quarter wave plate relative to a traveling direction of the beam from the light source.

13. The structured illumination microscope system according to claim 11, further comprising
    a control unit that sets a transmission polarization direction of the polarizer.

14. The structured illumination microscope system according to claim 11, further comprising
    a control unit that rotates the polarizer.

15. The structured illumination microscope system according to claim 1, wherein
    a phase difference between an ordinary beam and an extraordinary beam after passing through the first quarter wave plate and a phase difference between the ordinary beam and the extraordinary beam after passing through the second quarter wave plate are within 90°±5°, respectively.

16. The structured illumination microscope system according to claim 1, wherein
    the relationship of $0.20\phi1 \times \sin(6\theta1) \leq \phi2 \leq 0.30\phi1 \times \sin(6\theta1)$ is established, where $\theta1$ is a first structured illumination direction, $\phi1$ is a difference of a phase difference generated by the second quarter wave plate from 90° (quarter wave), and $\phi2$ is a difference of a phase difference generated by the first quarter wave plate from 90° (quarter wave).

17. The structured illumination microscope system according to claim 1, wherein
    the first position is different from the second position, and the third position is different from the fourth position.

18. The structured illumination microscope system according to claim 1, wherein
    the second quarter wave plate is secured to the beam splitter so as to rotate together with the beam splitter.

19. The structured illumination microscope system according to claim 1, wherein
    the second quarter wave plate is secured to the beam splitter so as to rotate together with the beam splitter relative to the first quarter wave plate which is not secured to the beam splitter and which does not rotate together with the beam splitter.

20. The structured illumination microscope system according to claim 1, wherein
    a direction of a fast axis of the first quarter wave plate is different from a direction of the fast axis of the second quarter wave plate.

21. A structured illumination microscope system comprising:
    a beam splitter that splits a beam from a light source into a plurality of beams, the beam splitter being a diffraction grating;
    a first quarter wave plate;

a second quarter wave plate disposed between the first quarter wave plate and the beam splitter; and
an objective lens, wherein
an interference fringe pattern is formed on a sample,
a fast axis of the second quarter wave plate is set at a first position when a pattern direction of the beam splitter is set at a second position,
the fast axis of the second quarter wave plate is set at a third position that is different from the first position when the pattern direction of the beam splitter is set at a fourth position that is different from the second position, and
the relationship of $0.20\phi1\times\sin(6\theta1)\leq\phi2\leq0.30\phi1\times\sin(6\theta1)$ is established, where $\theta1$ is a first structured illumination direction, $\phi1$ is a difference of a phase difference generated by the second quarter wave plate from 90° (quarter wave), and $\phi2$ is a difference of a phase difference generated by the first quarter wave plate from 90° (quarter wave).

* * * * *